United States Patent
Kusano et al.

(10) Patent No.: US 9,635,582 B2
(45) Date of Patent: Apr. 25, 2017

(54) RADIO BASE STATION, RADIO COMMUNICATION SYSTEM, AND CONTROL METHOD

(75) Inventors: Yoshimasa Kusano, Yokohama (JP); Kazutaka Nakamura, Yokohama (JP); Chiharu Yamazaki, Tokyo (JP); Taku Nakayama, Yamato (JP); Shingo Joko, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 573 days.

(21) Appl. No.: 13/700,124

(22) PCT Filed: May 27, 2011

(86) PCT No.: PCT/JP2011/062280
§ 371 (c)(1),
(2), (4) Date: Nov. 26, 2012

(87) PCT Pub. No.: WO2011/149085
PCT Pub. Date: Dec. 1, 2011

(65) Prior Publication Data
US 2013/0072259 A1  Mar. 21, 2013

(30) Foreign Application Priority Data
May 27, 2010 (JP) ................................. 2010-122145

(51) Int. Cl.
*H04W 28/02* (2009.01)
*H04W 36/16* (2009.01)
(Continued)

(52) U.S. Cl.
CPC ....... *H04W 28/0247* (2013.01); *H04W 28/08* (2013.01); *H04W 36/0005* (2013.01);
(Continued)

(58) Field of Classification Search
None
See application file for complete search history.

(56) References Cited

U.S. PATENT DOCUMENTS

| | | | |
|---|---|---|---|
| 7,698,438 B1* | 4/2010 | Shen | ....................... H04L 45/02 709/228 |
| 2006/0023677 A1* | 2/2006 | Labrador et al. | ............. 370/338 |

(Continued)

OTHER PUBLICATIONS

Chun, Ying, et al. "Routing protocols overview and design issues for self-organized network." Communication Technology Proceedings, 2000. WCC-ICCT 2000. International Conference on. vol. 2. IEEE, 2000.*

(Continued)

*Primary Examiner* — Ankur Jain
*Assistant Examiner* — Zhitong Chen
(74) *Attorney, Agent, or Firm* — Studebaker & Brackett PC

(57) ABSTRACT

Disclosed is a radio base station (eNB1) provided with a storage unit (130) for storing base station information for selecting the destination of a message, a network communication unit (140) for transmitting the message to another radio base station selected according to the base station information, and a control unit (120) for controlling the storage unit (130) to set as base station information the priority level of the radio base station to which the message was sent according to the state of response to the transmitted message.

4 Claims, 5 Drawing Sheets

(51) Int. Cl.
  *H04W 36/00*    (2009.01)
  *H04W 28/08*    (2009.01)
  *H04W 36/22*    (2009.01)

(52) U.S. Cl.
  CPC ........ *H04W 36/16* (2013.01); *H04W 36/0083* (2013.01); *H04W 36/22* (2013.01)

(56) References Cited

U.S. PATENT DOCUMENTS

| | | | | |
|---|---|---|---|---|
| 2008/0188177 | A1* | 8/2008 | Tan | H04B 7/2606 455/11.1 |
| 2010/0172249 | A1* | 7/2010 | Liu | H04L 45/124 370/252 |
| 2010/0284303 | A1* | 11/2010 | Catovic | H04W 24/02 370/254 |

OTHER PUBLICATIONS

Chun, Ying, et al. "Routing protocols overview and design issues for self-organized network." Communication Technology Proceedings, 2000. WCC-ICCT 2000. International Conference on. vol. 2. IEEE, 2000 (Hereinafter Ying).*
3GPP TS 36.423 V8.2.0 (Jun. 2008).*
3GPP TR 36.902 V9.0.0 (Sep. 2009); 3rd Generation Partnership Project; Technical Specification Group Radio Access Network; Evolved Universal Terrestrial Radio Access Network (E-UTRAN); Self-configuring and self-optimizing network use cases and solutions (Release 9).
3GPP TR 36.902 V9.1.0 (Mar. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9).
International Search Report; PCT/JP2011/062280; Jul. 26, 2011.

* cited by examiner

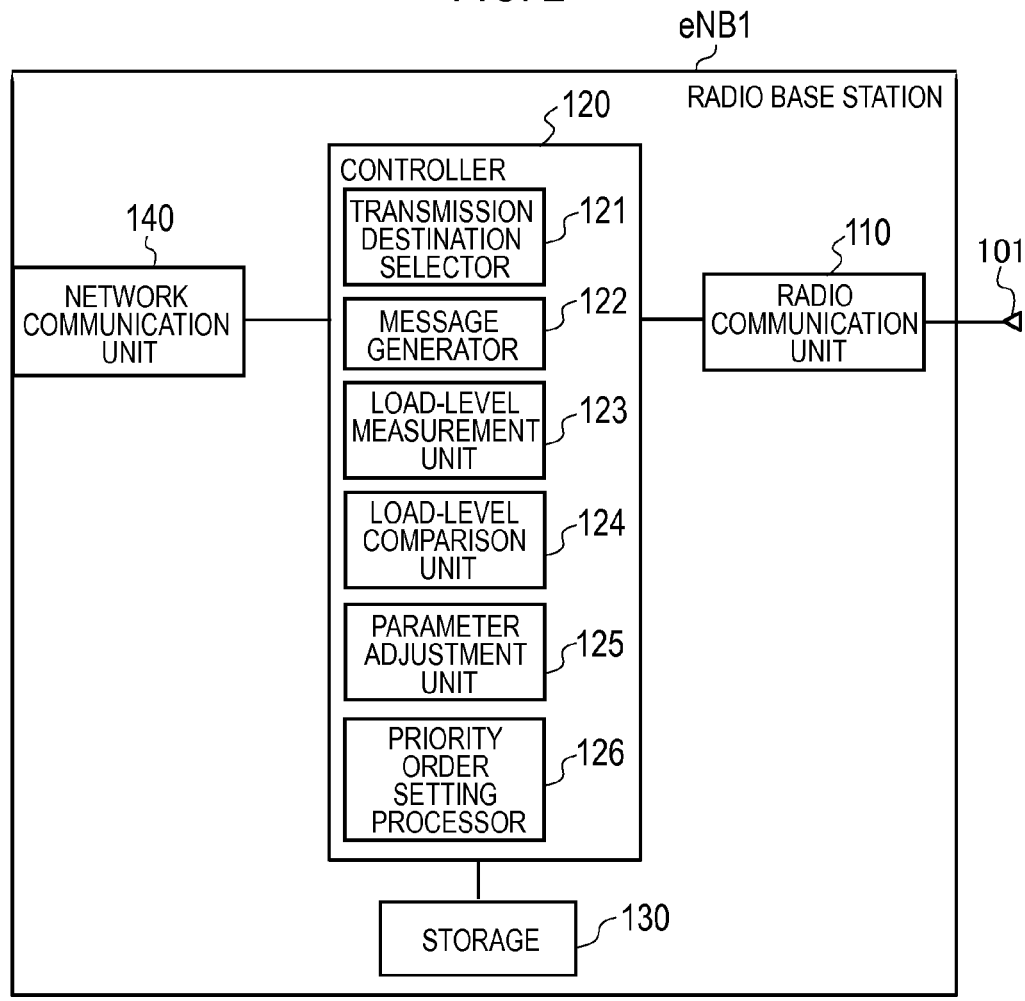

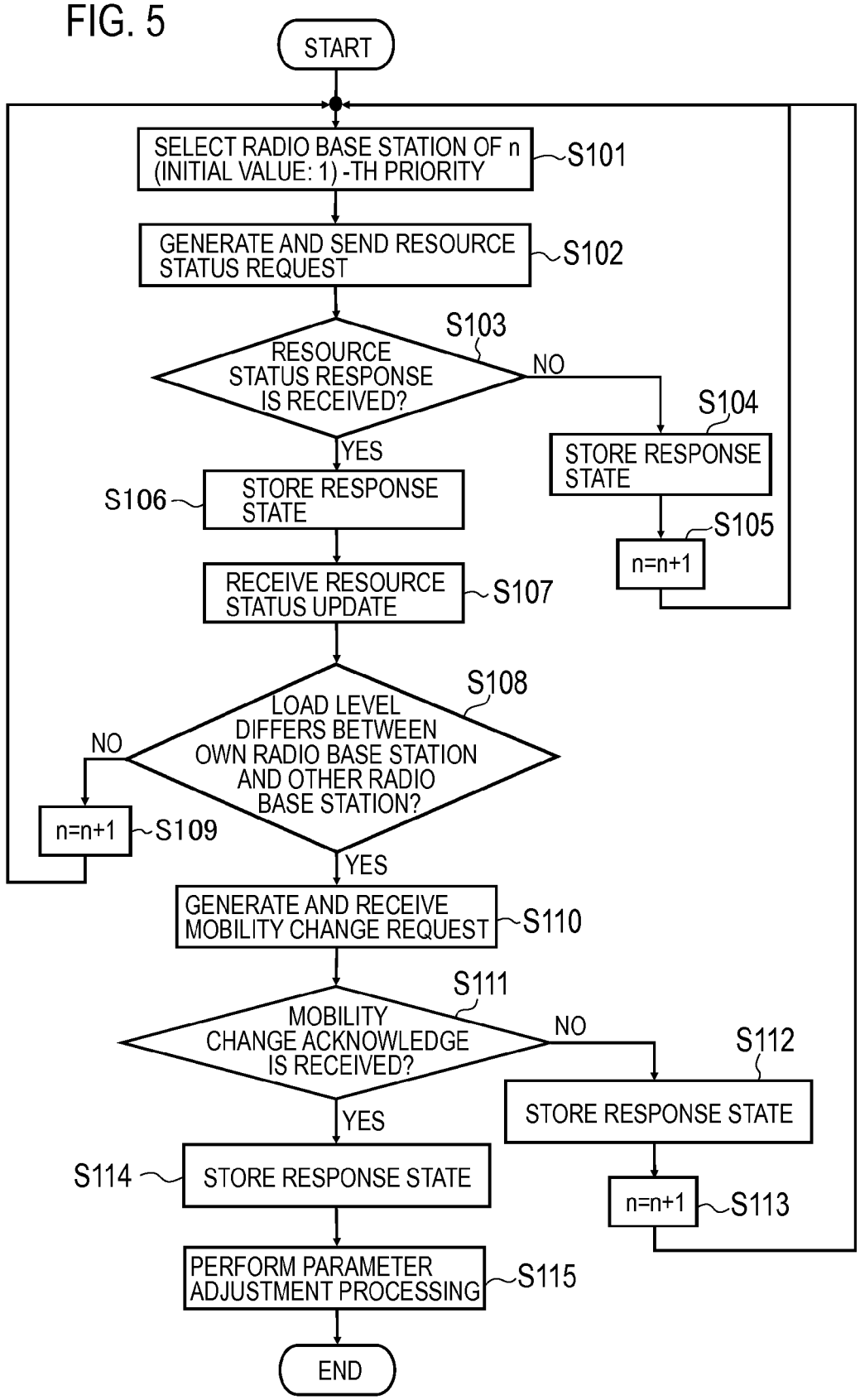

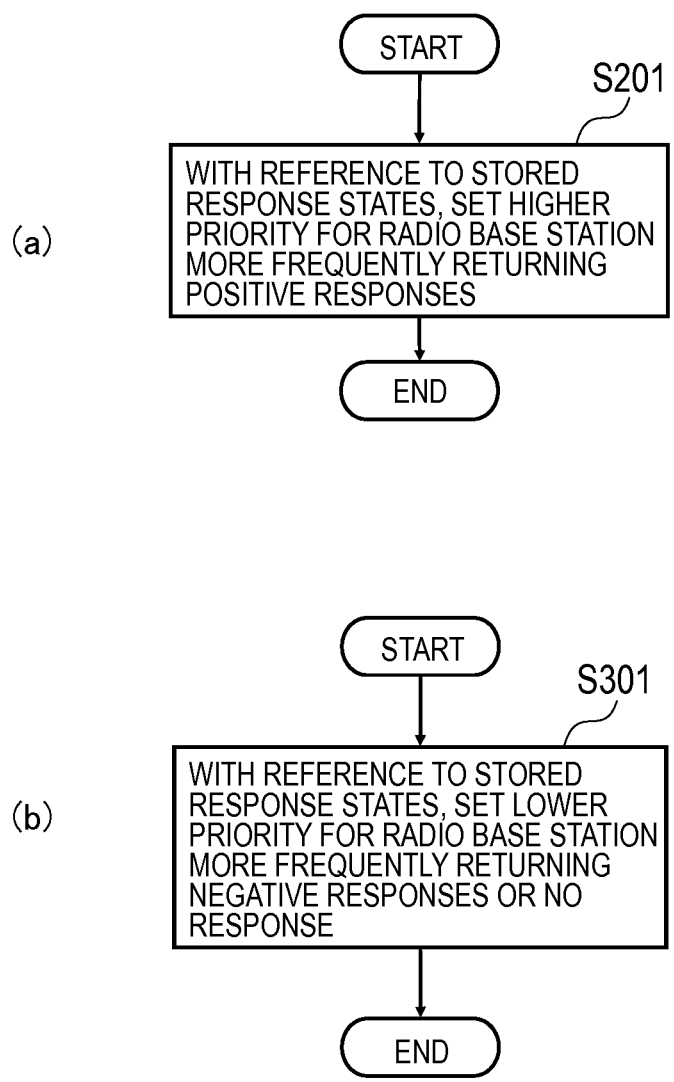

RADIO BASE STATION, RADIO COMMUNICATION SYSTEM, AND CONTROL METHOD

TECHNICAL FIELD

The present invention relates to a radio base station, a radio communication system, and a control method to which a SON technique is applied.

BACKGROUND ART

In LTE (Long Term Evolution) standardized in 3GPP (3rd Generation Partnership Project) which is a standardization organization for radio communication systems, there are applied SON (Self Organizing Network) techniques in which a radio base station itself autonomously adjusts its own parameters (referred to below as base station parameters) without human intervention (see Non-Patent Document 1, for example).

As one of the SON techniques, there is proposed a method by which base station parameters (such as handover parameters) defining coverage are adjusted according to messages exchanged between radio base stations in order to balance loads between the radio base stations. Such an optimization technique is referred to as MLB (Mobility Load Balancing). Note that coverage means a logical or physical communication area of a radio base station.

PRIOR ART DOCUMENT

Non-Patent Document

Non-Patent Document 1: 3GPP TR36. 902 "SON use cases and solutions"

SUMMARY OF THE INVENTION

In SON techniques, a radio base station is assumed to send a message (referred to below as a SON related message) for autonomous parameter adjustment to all neighboring radio base stations. However, in such a method, the amount of SON related messages sent through transmission paths between radio base stations increases, and may lead to congestion in the transmission paths.

Accordingly, the present invention has an objective to provide a radio base station, a radio communication system, and a control method capable of reducing the amount of SON related messages sent through transmission paths between radio base stations.

In order to solve the aforementioned problem, the present invention has the following features.

First of all, a feature of a radio base station according to the present invention is summarized as follows. A radio base station (radio base station eNB1) used in a radio communication system capable of autonomously adjusting base station parameters according to messages exchanged between radio base stations, comprises: a storage (storage 130) configured to store base station information used to select transmission destinations of the messages; a transmitter (network communication unit 140) configured to transmit the messages to other radio base stations selected by referring to the base station information; and a controller (controller 120) configured to control the storage so that the storage sets a priority order to select radio base stations as transmission destinations of the messages in the base station information, according to states of responses to the messages transmitted by the transmitter.

According to the feature, the radio base station configured to transmit messages to the other radio base stations selected based on the base station information sets a priority order to select the radio base stations as transmission destinations of the messages in base station information, according to states of responses to the transmitted messages. This makes it possible to effectively reduce the number of radio base stations to be transmission destinations of the messages, and thereby to reduce the amount of SON related messages sent through transmission paths between the radio base stations.

Another feature of the radio base station according to the present invention is summarized as follows. In the radio base station according to the aforementioned feature, the controller controls the storage so that the storage sets a higher priority for a radio base station which more frequently returns a positive response to the messages.

Another feature of the radio base station according to the present invention is summarized as follows. In the radio base station according to the aforementioned feature, the controller controls the storage to set a lower priority for a radio base station which more frequently returns a negative response to the messages.

Another feature of the radio base station according to the present invention is summarized as follows. In the radio base station according to the aforementioned feature, the controller controls the storage to set a lower priority for a radio base stations which more frequently makes no response to the messages.

Another feature of the radio base station according to the present invention is summarized as follows. In the radio base station according to the aforementioned feature, the controller controls the transmitter to transmit the messages to the other radio base stations selected in descending order of the priority.

A feature of a radio communication system according to the present invention is summarized as follows. A radio communication system (radio communication system 1) capable of autonomously adjusting base station parameters according to messages exchanged between radio base stations, comprises: a storage (storage 130) configured to store base station information used to select transmission destinations of the messages; a transmitter (network communication unit 140) configured to transmit the messages to other radio base stations selected by referring to the base station information; and a controller (controller 120) configured to control the storage so that the storage sets a priority order to select radio base stations as transmission destinations of the me s sages in the base station information, according to states of responses to the messages sent by the transmitter.

A feature of a control method according to the present invention is summarized as follows. A control method for a radio base station used in a radio communication system capable of autonomously adjusting base station parameters according to messages exchanged between radio base stations, comprises the steps of: storing base station information used to select transmission destinations of the messages; transmitting the messages to other radio base stations selected by referring to the base station information; and setting a priority order to select radio base stations as transmission destinations of the messages in the base station information, according to states of responses to the messages transmitted in the transmitting step.

BRIEF DESCRIPTION OF THE DRAWINGS

FIG. 2 is a block diagram showing a configuration of a radio base station of the embodiment of the present invention.

FIG. 3 is a diagram for explaining base station information in which priority orders are set, according to the embodiment of the present invention.

FIG. 5 is a flowchart showing a detailed operation example of a radio base station of the embodiment of the present invention.

FIG. 6 is a flowchart showing an exemplar priority order setting operation of the radio base station of the embodiment of the present invention.

DESCRIPTION OF THE EMBODIMENTS

Next, a description is given of embodiments of the present invention with reference to the drawings. To be specific, descriptions are given of (1) configuration of radio communication system, (2) configuration of radio base station, (3) operation of radio communication system, (4) effects and advantages, and (5) other embodiments. In the following description of the drawings in the embodiments, same or similar reference signs denote same or similar portions.

(1) Configuration of Radio Communication System

Figure 1:
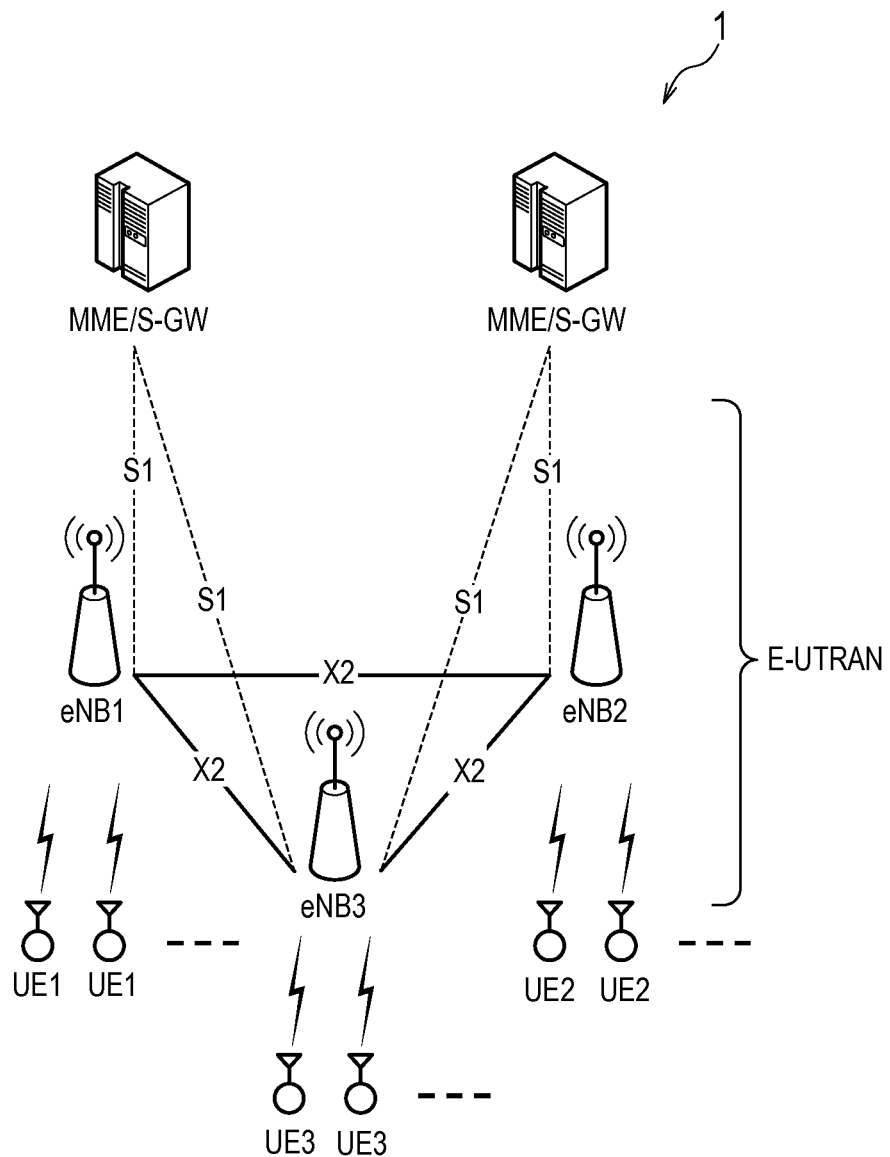
FIG. 1 is a view showing a configuration of a radio communication system of an embodiment of the present invention.

FIG. 1 is a view showing a configuration of a radio communication system 1 of this embodiment. The radio communication system 1 is configured according to LTE standards.

As shown in FIG. 1, multiple radio base stations eNB (radio base stations eNB1 to eNB3) form an E-UTRAN (Evolved-UMTS Terrestrial Radio Access Network). Each of the multiple radio base stations eNB forms a cell which is a communication area for providing a service to radio terminals UE.

Adjacent radio base stations eNB can communicate via an X2 interface being a logical communication path providing inter-base station communication. Each of the multiple radio base stations eNB can communicate with an EPC (Evolved Packet Core), namely, an MME (Mobility Management Entity) or an S-GW (Serving Gateway) via an S1 interface.

A radio terminal UE is a radio communication device held by a user, and is also referred to as a user device. Multiple radio terminals UE1 connect to the radio base station eNB1 in a cell formed by the radio base station eNB1. Multiple radio terminals UE2 connect to the radio base station eNB2 in a cell formed by the radio base station eNB2. Multiple radio terminals UE3 connect to the radio base station eNB3 in a cell formed by the radio base station eNB3.

The radio terminal UE measures quality of a radio signal (i.e., radio quality) received from the radio base station eNB, and sends a report on the result of measurement of radio quality (measurement report) to the connecting radio base station eNB. Here, radio quality refers to a reference signal received power (RSRP), for example. A measurement report may be sent from the radio terminal UE to the radio base station eNB by using an event set by the radio base station eNB as a trigger, or may be periodically sent from the radio terminal UE to the radio base station eNB.

The radio base station eNB to which the radio terminal UE connects performs handover control in which a connection destination of the radio terminal UE is switched according to a measurement report received from the radio terminal UE. In a case where the radio terminal UE receives reference signals from multiple radio base stations eNB, the measurement report may include multiple RSRPs of the multiple radio base stations eNB. The radio base station eNB to which the radio terminal UE connects performs control according to the measurement report, so that the radio terminal UE may connect to a radio base station eNB having the highest RSRP among the multiple radio base stations eNB, for example.

The radio communication system 1 supports aforementioned MLB. In this embodiment, each of the radio base stations eNB adjusts a handover parameter as a base station parameter defining coverage, according to load information exchanged between the radio base stations eNB. For example, when a load of the radio base station eNB1 is higher than a load of the radio base station eNB2 (or eNB3), the radio base stations eNB adjust the handover parameters so that coverage of the radio base station eNB1 can be reduced and coverage of the radio base station eNB2 (or eNB3) can be expanded.

In this embodiment, the handover parameter is an offset value for correcting the RSRP measured by the radio terminal UE. For example, assume a case where the radio terminal UE1 can receive radio signals from both of the radio base station eNB1 and the radio base station eNB2. Here, before comparing an RSRP (referred to below as RSRP1) of the radio base station eNB1 and an RSRP (referred to below as RSRP2) of the radio base station eNB2, an offset value for correcting RSRP1 to a higher value is added to RSRP1. This makes it more likely for the offset RSRP1 to exceed RSRP2. Accordingly, the radio base station eNB1 is preferentially selected as the connection destination (handover destination), and thus coverage of the radio base station eNB1 is expanded. Note that in order to avoid unnecessary handovers, one offset value is set for each pair of radio base stations eNB, and the value is shared between the paired radio base stations eNB.

Hereinbelow, a description is given mainly of a case where handover parameters are adjusted under the initiative of the radio base station eNB1.

(2) Configuration of Radio Base Station

Next, a description is given of a configuration of the radio base station eNB1. The radio base stations eNB other than the radio base station eNB1 are assumed to have the same configuration as the radio base station eNB1. In addition, another neighboring radio base station of the radio base station eNB1 is hereinafter referred to as a radio base station eNBx.

(2.1) Functional Block Configuration

FIG. 2 is a block diagram showing a configuration of the radio base station eNB1.

As shown in FIG. 2, the radio base station eNB1 includes an antenna unit 101, a radio communication unit 110, a controller 120, a storage 130, and a network communication unit 140.

The antenna unit 101 is used to send and receive radio signals. The radio communication unit 110 is formed of a radio frequency (RF) circuit, a baseband (BB) circuit and the like, for example, and exchanges radio signals with the radio terminal UE1 via the antenna unit 101. In addition, the radio communication unit 110 modulates and encodes transmission signals, as well as demodulates and decodes reception signals.

The controller 120 is formed of a CPU, for example, and controls various functional blocks of the radio base station eNB1. The storage 130 is formed of a memory, for example, and stores therein various kinds of information used for control and the like of the radio base station eNB1. The network communication unit 140 performs inter-base station communication using the X2 interface, and communication using the S1 interface.

The storage 130 stores therein base station information for selecting a transmission destination of a Resource Status Request message and a Mobility Change Request message as SON related messages. Here, a Resource Status Request message is a message for requesting transmission of load information. A Mobility Change Request message is a message for requesting a change in a handover parameter. Base station information includes a list (namely, a neighbor list) of identification information on neighboring other radio base stations eNBx of the radio base station eNB1. In the base station information, a priority order is set for the radio base stations eNBx to be transmission destinations of SON related messages.

The controller 120 includes a transmission destination selector 121, a message generator 122, a load-level measurement unit 123, a load-level comparison unit 124, a parameter adjustment unit 125, and a priority order setting processor 126.

The transmission destination selector 121 selects radio base stations eNBx to be transmission destinations of a SON related message, by referring to base station information stored in the storage 130. Before a priority order is set in the base station information, the transmission destination selector 121 selects all neighboring radio base stations eNBx of the radio base station eNB1 as transmission destinations of a SON related message. After the priority order is set in the base station information, the transmission destination selector 121 refers to the base station information in the storage 130, and selects only the radio base stations eNBx satisfying a predetermined condition in descending order of priority as transmission destinations of the SON related message, from among the plurality of radio base stations eNBx. Here, the predetermined condition may be the number of radio base stations such as "two highest priority radio base stations," or may be ranks in the priority order such as "top and second highest priority radio base stations."

The message generator 122 generates a Resource Status Request message and a Mobility Change Request message as SON related messages. Here, each of the Resource Status Request message and the Mobility Change Request message includes the identification information on the radio base station eNBx selected by the transmission destination selector 121. The Resource Status Request message and the Mobility Change Request message is sent by the network communication unit 140 to the radio base station eNBx selected by the transmission destination selector 121.

Note that a Resource Status Request message includes Report Characteristics which is information indicating a class of load information whose transmission is requested, and information indicating a transmission cycle of load information. Here, classes of load information include the following (a) to (d). (a) Usage of PRBs (Physical Resource Blocks) being units for time-frequency resource allocation, (b) load of backhaul between a radio base station and a core network, (c) hardware load of a radio base station, and (d) capacity class being an index of relative communication capacity of a radio base station, and a ratio of available communication capacity to the communication capacity.

Upon receipt of a Resource Status Request message, the radio base station eNBx sends a Resource Status Response message being a positive response, or a Resource Status Failure message being a negative response to the radio base station eNB1. Note, however, that the radio base station eNBx having received the Resource Status Request message may be configured to not send either of the Resource Status Response message or the Resource Status Failure message to the radio base station eNB1. After sending the Resource Status Response message, the radio base station eNBx sends Resource Status Update messages including load information in the transmission cycle included in the Resource Status Request message. At this time, the radio base station eNBx sends load information of a class indicated by Report Characteristics included in the Resource Status Request message. The network communication unit 140 periodically receives Resource Status Response messages from the radio base station eNBx.

In addition, a Mobility Change Request message includes Handover Trigger Change indicating an adjusted handover parameter to be presented to the radio base station eNBx. Upon receipt of the Mobility Change Request message, the radio base station eNBx sends a Mobility Change Acknowledge message being a positive response or a Mobility Change Failure message being a negative response to the radio base station eNB1. Note, however, that the radio base station eNBx having received the Mobility Change Request message may be configured to not send either of the Mobility Change Acknowledge message or the Mobility Change Failure message to the radio base station eNB1. After sending the Mobility Change Acknowledge message, the radio base station eNBx sets the adjusted handover parameter indicated by Handover Trigger Change.

The load-level measurement unit 123 measures its own load level (i.e., load level of the radio base station eNB1). The load-level measurement unit 123 may be configured to measure the load level only of the class selected in the aforementioned Report Characteristics.

The load-level comparison unit 124 compares its own load level measured by the load-level measurement unit 123, and the load level of the radio base station eNBx indicated by load information (Resource Status Update message) received by the network communication unit 140. The load-level comparison unit 124 makes a comparison every time the network communication unit 140 receives a Resource Status Update message.

The parameter adjustment unit 125 adjusts the handover parameter according to a result of comparison made by the load-level comparison unit 124. To be specific, the parameter adjustment unit 125 adjusts the handover parameter to expand its coverage when its own load level is lower than the load level of the radio base station eNBx. For example, the parameter adjustment unit 125 increases an offset value to be added to an RSRP of its own radio base station eNB1, or decreases an offset value to be added to an RSRP of the radio base station eNBx, to thereby make spurious expansion of its coverage. Moreover, the parameter adjustment unit 125 adjusts the handover parameter to reduce its coverage when its corrected load level is higher than the load level of the radio base station eNBx. For example, the parameter adjustment unit 125 decreases the offset value to be added to the RSRP of its own radio base station eNB1, or increases the offset value to be added to the RSRP of the radio base station eNBx, to thereby make spurious reduction of its coverage.

Note that the parameter adjustment unit 126 needs to be permitted by the radio base station eNBx to adjust the handover parameter. For this reason, the radio base station eNB1 notifies the radio base station eNBx of the adjusted handover parameter by a Mobility Change Request message, and adjusts the handover parameter only when it is confirmed that the adjusted handover parameter is accepted.

The priority order setting processor 126 sets a priority order to select the radio base stations eNBx as transmission destinations of the SON related message in the base station information, according to states of responses to the SON related message sent by the network communication unit 140. To be specific, the priority order setting processor 126 stores the states of responses to the SON related message sent by the network communication unit 140, determines the priority order by statistically processing the stored response states, and sets the determined priority order in the base station information.

For example, the priority order setting processor 126 sets a higher priority for the radio base station eNBx which more frequently returns a positive response to a SON related message. In contrast, the priority order setting processor 126 sets a lower priority for the radio base station eNBx which more frequently returns a negative response to a SON related message. Moreover, the priority order setting processor 126 sets a lower priority for the radio base station eNBx which more frequently makes no response to a SON related message.

The priority order setting processor 126 regularly updates the priority order set in the base station information according to the states of responses to SON related messages, even after setting the first priority order (i.e., initial setting) in the base station information. In other words, "setting a priority order" by the priority order setting processor 126 is a concept including regular updates of the priority order in addition to an initial setting of the priority order.

(2.2) Configuration Examples of Base Station Information

FIG. 3 is a diagram for explaining base station information in which priority orders are set. FIG. 3(*a*) shows configuration example 1 of base station information, and FIG. 3 (*b*) shows configuration example 2 of base station information.

Configuration example 1 of base station information shown in FIG. 3(*a*) includes a neighbor list being a list of identification information on neighboring radio base stations eNBx of the radio base station eNB1, and priority order information associated with the neighbor list. In the example of FIG. 3(*a*), a priority of a neighboring radio base station eNB2 of the radio base station eNB1 is set to "2," a priority of a neighboring radio base station eNB3 of the radio base station eNB1 is set to "1," a priority of a neighboring radio base station eNB4 of the radio base station eNB1 is set to "3," a priority of a neighboring radio base station eNB5 of the radio base station eNB1 is set to "6," a priority of a neighboring radio base station eNB6 of the radio base station eNB1 is set to "5," and a priority of a neighboring radio base station eNB7 of the radio base station eNB1 is set to "4."

For example, by referring to the base station information shown in FIG. 3(*a*), the transmission destination selector 121 selects three highest priority radio base stations eNBx, namely, the radio base station eNB2, the radio base station eNB3, and the radio base station eNB4 as transmission destinations of a Resource Status Request message.

In configuration example 2 of base station information shown in FIG. 3(*b*), a priority is set for every two radio base stations eNBx. In the example of FIG. 3(*b*), a priority of the neighboring radio base station eNB2 of the radio base station eNB1 is set to "1," a priority of the neighboring radio base station eNB3 of the radio base station eNB1 is set to "1," a priority of the neighboring radio base station eNB4 of the radio base station eNB1 is set to "3," a priority of the neighboring radio base station eNB5 of the radio base station eNB1 is set to "2," a priority of the neighboring radio base station eNB6 of the radio base station eNB1 is set to "3," and a priority of the neighboring radio base station eNB7 of the radio base station eNB1 is set to "2."

For example, by referring to the base station information shown in FIG. 3(*b*), the transmission destination selector 121 selects the top and second priority radio base stations eNBx, namely, the radio base station eNB2, the radio base station eNB3, the radio base station eNB5, and the radio base station eNB7 as transmission destinations of a Resource Status Request message.

(3) Operation of Radio Communication System

Next, an operation of the radio communication system 1 is described in the order of: an overall operation example of the radio communication system 1, an overall operation example of the radio base station eNB1, and an exemplar priority order setting operation of the radio base station eNB1.

(3.1) Overall Operation Example of Radio Communication System 1

Figure 4:
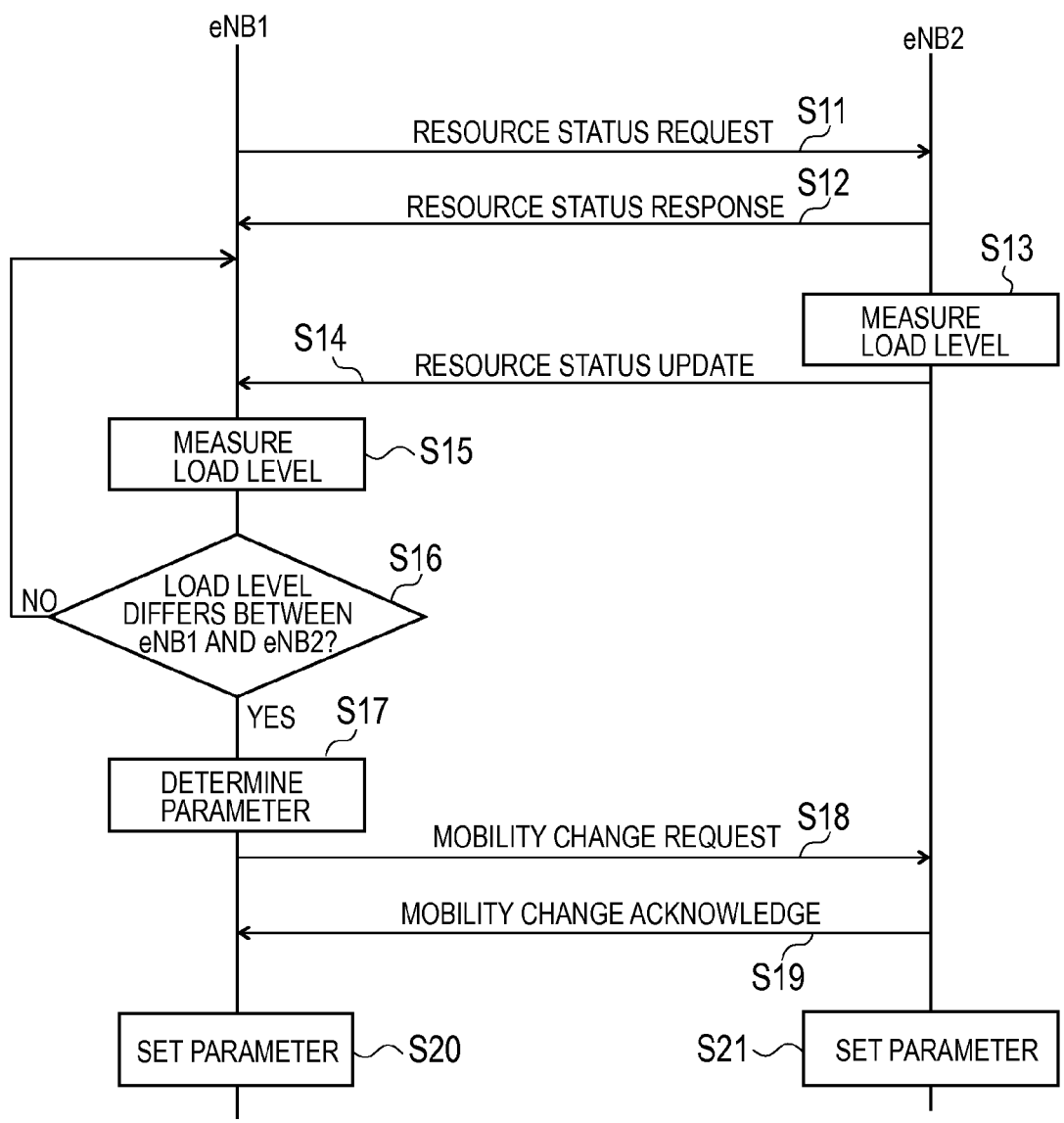
FIG. 4 is an operation sequence chart showing an overall operation example of the radio communication system of the embodiment of the present invention.

FIG. 4 is an operation sequence chart showing an overall operation example of the radio communication system 1. Here, a description is given of a case where handover parameters are adjusted between the radio base station eNB1 and the radio base station eNB2. In this case, assume that the radio base station eNB2 sends positive responses to a Resource Status Request message and a Mobility Change Request message sent from the radio base station eNB1.

In step S11, the transmission destination selector 121 of the radio base station eNB1 selects the radio base station eNB2 as the transmission destination of a Resource Status Request message, the message generator 122 generates the Resource Status Request message, and the network communication unit 140 sends the Resource Status Request message to the radio base station eNB2. The radio base station eNB2 receives the Resource Status Request message.

In step S12, in a case of accepting the Resource Status Request message, the radio base station eNB2 sends a Resource Status Response message to the radio base station eNB1. The network communication unit 140 of the radio base station eNB1 receives the Resource Status Response message.

In step S13, the radio base station eNB2 measures its own load level. Note that the processing of step S13 may be performed between steps S11 and S12.

In step S14, the radio base station eNB2 sends a Resource Status Update message including load information indicating the measured load level to the radio base station eNB1. The network communication unit 140 of the radio base station eNB1 receives the Resource Status Update message.

In step S15, the load-level measurement unit 123 of the radio base station eNB1 measures its own load level.

In step S16, the load-level comparison unit 124 of the radio base station eNB1 compares its own load level (load level of the radio base station eNB1) and the load level of the radio base station eNB2. When the load level of the radio base station eNB1 and the load level of the radio base station eNB2 are the same, the handover parameter is in an optimized state, and thus the processing returns to step S13. Instead, when the load levels are judged as the same multiple times successively, the processing may be terminated. Meanwhile, when the load level of the radio base station eNB1 and the load level of the radio base station eNB2 are different, the handover parameter needs to be adjusted, and the processing proceeds to step S17.

In step S17, the parameter adjustment unit 125 of the radio base station eNB1 determines an adjusted handover parameter. For example, when the load level of the radio base station eNB1 is lower than the load level of the radio base station eNB2, the parameter adjustment unit 125 determines an adjusted handover parameter so that coverage of the radio base station eNB1 is expanded. Meanwhile, when the load level of the radio base station eNB1 is higher than the load level of the radio base station eNB2, the parameter adjustment unit 125 determines an adjusted handover parameter so that coverage of the radio base station eNB1 is reduced.

In step S18, the message generator 122 generates a Mobility Change Request message including the adjusted handover parameter, and the network communication unit 140 sends the Mobility Change Request message to the radio base station eNB2. The radio base station eNB2 receives the Mobility Change Request message.

In step S19, in a case of accepting the Mobility Change Request message, the radio base station eNB2 sends a Mobility Change Acknowledge message to the radio base station eNB1. The network communication unit 140 of the radio base station eNB1 receives the Mobility Change Acknowledge message.

In step S20, the radio base station eNB1 sets its adjusted handover parameter. In step S21, the radio base station eNB2 sets its adjusted handover parameter.

(3.2) Detailed Operation Example of Radio Base Station eNB1

FIG. 5 is a flowchart showing a detailed operation example of the radio base station eNB1. Here, a description is given of an operation of the radio base station eNB1 after a priority order is initially set.

In step S101, the transmission destination selector 121 refers to base station information in the storage 130, and selects a radio base station eNBx of an n-th priority as the transmission destination of a Resource Status Request message. Here, an initial value of n is 1, and the transmission destination selector 121 selects the radio base station eNBx of the top priority.

In step S102, the message generator 122 generates a Resource Status Request message, and the network communication unit 140 sends the Resource Status Request message to the radio base station eNBx of the n-th priority.

After transmission of the Resource Status Request message, if a Resource Status Response message is not received from the radio base station eNBx of the n-th priority (step S103: NO), i.e., if a Resource Status Failure message is received or a timeout occurs without receiving any response, in step S104, the priority order setting processor 126 stores the response state to the storage 130 in association with the radio base station eNBx of the n-th priority. Then, in step S105, after adding 1 to the priority index n, the processing returns to step S101.

After transmission of the Resource Status Request message, if, on the other hand, a Resource Status Response message is received from the radio base station eNBx of the n-th priority (step S103: YES), in step S106, the priority order setting processor 126 stores the response state to the storage 130 in association with the radio base station eNBx of the n-th priority.

In step S107, the network communication unit 140 receives a Resource Status Update message including load information on the radio base station eNBx of the n-th priority from the radio base station eNBx of the n-th priority.

In step S108, the load-level comparison unit 124 compares its own load level (load level of the radio base station eNB1) measured by the load-level measurement unit 123 and the load level of the radio base station eNBx of the n-th priority indicated by the load information (Resource Status Update message) received by the network communication unit 140.

When the load level of the radio base station eNB1 and the load level of the radio base station eNBx of the n-th priority are the same, the handover parameter is in an optimized state, and thus the processing returns to step S101. Meanwhile, when the load level of the radio base station eNB1 and the load level of the radio base station eNBx of the n-th priority are different, the handover parameter needs to be adjusted, and the processing proceeds to step S110.

In step S110, the parameter adjustment unit 125 determines an adjusted handover parameter. The message generator 122 generates a Mobility Change Request message including the adjusted handover parameter. The network communication unit 140 sends the Mobility Change Request message to the radio base station eNBx of the n-th priority.

After transmission of the Mobility Change Request message, if a Resource Status Response message is not received from the radio base station eNBx of the n-th priority (step S111: NO), i.e., if a Mobility Change Failure message is received or a timeout occurs without receiving any response, in step S112, the priority order setting processor 126 stores the response state to the storage 130 in association with the radio base station eNBx of the n-th priority. Then, in step S113, after adding 1 to the priority index n, the processing returns to step S101.

After transmission of the Mobility Change Request message, if, on the other hand, a Resource Status Response message is received from the radio base station eNBx of the n-th priority (step S111: YES), in step S114, the priority order setting processor 126 stores the response state to the storage 130 in association with the radio base station eNBx of the n-th priority.

In step S115, the parameter adjustment unit 125 sets its adjusted handover parameter, i.e., stores the adjusted handover parameter to the storage 130.

(3.3) Exemplar Priority Order Setting Operation of Radio Base Station eNB1

FIG. 6 is a flowchart showing an exemplar priority order setting operation of the radio base station eNB1. FIG. 6(a) shows exemplar priority order setting operation 1, and FIG. 6(b) shows exemplar priority order setting operation 2. Although this case assumes execution of both of the exemplar priority order setting operations 1 and 2, it suffices that only one of the operations is executed in other cases. Timings to execute the exemplar priority order setting operation 1 and/or the exemplar priority order setting operation 2 may be timings according to predetermined cycles.

As shown in FIG. 6(a), in step S201, the priority order setting processor 126 reads the response states stored in the storage 130 for the respective radio base stations eNBx, and counts the number (frequency) of positive responses made by each of the radio base stations eNBx. Then, the priority order setting processor 126 updates the base station information in the storage 130, by setting a higher priority for the radio base station eNBx as the counted number of times (frequency) becomes larger.

As shown in FIG. 6(b), in step S301, the priority order setting processor 126 reads the response states stored in the storage 130 for the respective radio base stations eNBx, and counts the number (frequency) of negative responses made and/or the number of times (frequency) no response was made by each of the radio base stations eNBx. Then, the priority order setting processor 126 updates the base station information in the storage 130, by setting a lower priority for the radio base station eNBx as the counted number of times (frequency) becomes larger.

(4) Effects and Advantages

As has been described, according to this embodiment, the controller 120 controls the storage 130 so that the storage 130 sets a priority order to select the radio base stations as transmission destinations of SON related messages in base station information, according to states of responses to a transmitted SON related message. This makes it possible to effectively reduce the number of radio base stations to be transmission destinations of a SON related message, and thereby to reduce the amount of SON related messages sent through transmission paths between the radio base stations.

Moreover, in this embodiment, the controller 120 controls the storage 130 so that the storage 130 sets a higher priority for a radio base station which more frequently returns a positive response to a SON related message. This makes it possible to preferentially send SON related messages to the radio base station which frequently returns a positive response to a SON related message. Accordingly, the possibility of wasteful transmission of SON related messages is reduced, and thus the amount of SON related messages sent through transmission paths between the radio base stations can be effectively reduced.

Furthermore, in this embodiment, the controller 120 controls the storage 130 so that the storage 130 sets a lower priority for a radio base station which more frequently returns a negative response to a SON related message. This makes it possible to preferentially exclude the radio base station which frequently returns a negative response to a SON related message from transmission destinations of a SON related message. Accordingly, the possibility of wasteful transmission of SON related messages is reduced, and thus the amount of SON related messages sent through transmission paths between the radio base stations can be effectively reduced.

Additionally, in this embodiment, the controller 120 controls the controller 130 so that the storage 130 sets a lower priority for a radio base station which more frequently makes no response to a SON related message. This makes it possible to preferentially exclude the radio base station which frequently makes no response to a SON related message from transmission destinations of a SON related message. Accordingly, the possibility of wasteful transmission of SON related messages is reduced, and thus the amount of SON related messages sent through transmission paths between the radio base stations can be effectively reduced.

(5) Other Embodiments

Hereinabove, the present invention has been described by using the embodiments. However, it should not be understood that the description and drawings which constitute part of this disclosure limit the present invention. From this disclosure, various alternative embodiments, examples, and operation techniques will be easily found by those skilled in the art.

Although an offset value is described as a handover parameter in the above embodiment, a handover threshold compared with an RSRP may be adjusted instead of the offset value. Moreover, instead of adjusting the handover parameter, other base station parameters (such as an antenna tilt angle or a transmission power) may be adjusted.

The above embodiment has been described by using MLB being a SON technique for balancing loads between base stations as an example. However, for a lower handover failure rate, the present invention may also be applied to techniques such as: MRO (Mobility Robustness Optimization) being a SON technique for adjusting handover parameters; and energy saving being a SON technique for reducing energy consumption of a radio base station eNB.

The description of the above embodiment has been given of a radio communication system according to LTE (3GPP Release 8 or 9). However, in LTE Advanced (3GPP Release 10) of an advanced version of LTE, provision of a heterogeneous network including multiple types of radio base stations having different transmission powers is planned. The present invention is also applicable to such a heterogeneous network. Moreover, in LTE Advanced, provision of a relay node being a radio base station forming backhaul by radio waves is also planned. Such a relay node may also be used as the radio base station of the present invention.

Furthermore, although the above embodiment has been described using an LTE system, the present invention is also applicable to other radio communication systems such as a radio communication system according to mobile WiMAX (IEEE 802.16e).

Hence, it should be understood that the present invention includes various embodiments which are not described herein.

Note that the entire content of Japanese Patent Application No. 2010-122145 (filed on May 27, 2010) is incorporated herein by reference.

INDUSTRIAL APPLICABILITY

As has been described, the radio base station, the radio communication system, and the control method of the present invention are capable of reducing the amount of SON related messages sent through transmission paths between radio base stations, and thus are useful in radio communication such as mobile communication.

The invention claimed is:

1. A radio base station, comprising:
    a storage configured to store a base station list indicating a plurality of neighbor radio base stations, each of the plurality of neighbor radio base stations being connected to the radio base station through an X2 interface;
    a transmitter configured to transmit a plurality of request messages to each of the plurality of neighbor radio base stations through the X2 interface, each of the plurality of request messages including a request for requesting transmission of load information or requesting a change in a handover parameter;
    a receiver configured to receive a plurality of responses from each of the plurality of neighbor radio base stations through the X2 interface, each of the plurality of responses including either a positive response indicating that a respective request is accepted or a negative response indicating that the respective request is rejected; and
    a controller configured to:
        autonomously adjust base station parameters according to the received responses, the base station parameters defining a coverage of the radio base station,
        set a priority to each of the plurality of neighbor radio base stations according to a plurality of the received responses, wherein the controller decreases the priority of a neighbor radio base station in response to receiving the negative response from the neighbor radio base station, and the controller decreases the priority of a neighbor radio base station in response to not receiving any of the responses from the neighbor radio base station; and select, on the basis of the respective priority of each of the plurality of neighbor radio base station, a first neighbor radio base station as a transmission destination of one of the plurality of request messages, wherein the transmitter is further configured to transmit the one of the plurality of request messages to the first neighbor radio base station through the X2 interface.

2. The radio base station according to claim 1, wherein the controller is further configured to set a higher priority for a neighbor radio base station which more frequently transmits the positive response.

3. The radio base station according to claim 1, wherein the controller is further configured to set a lower priority for a neighbor radio base station which more frequently transmits the negative response.

4. A control method for a radio base station used in a radio communication system, comprising the steps of:

storing a base station list indicating a plurality of neighbor radio base stations, each of the plurality of neighbor radio base stations being connected to the radio base station through an X2 interface;

transmitting a plurality of request messages to each of the plurality of neighbor radio base stations through the X2 interface, each of the plurality of request messages including a request for requesting transmission of load information or requesting a change in a handover parameter;

receiving a plurality of responses from each of the plurality of neighbor radio base stations through the X2 interface, each received response including either a positive response indicating that a respective request is accepted or a negative response indicating that the respective request is rejected, autonomously adjusting base station parameters according to the received responses, the base station parameters defining a coverage of the radio base station;

setting a priority to each of the plurality of neighbor radio base stations according to the plurality of received responses, wherein the controller decreases the priority of a neighbor radio base station in response to receiving the negative response from the neighbor radio base station, and the controller decreases the priority of a neighbor radio base station in response to not receiving any of the responses from the neighbor radio base station;

selecting, on the basis of the respective priority of each of the plurality of neighbor radio base station, a first neighbor radio base station as a transmission destination of one of the plurality of request messages; and transmitting the one of the plurality of request messages to the first neighbor radio base station through the X2 interface.

* * * * *